(12) United States Patent
Yokoi et al.

(10) Patent No.: US 10,465,623 B2
(45) Date of Patent: Nov. 5, 2019

(54) HYBRID VEHICLE

(71) Applicant: TOYOTA JIDOSHA KABUSHIKI KAISHA, Toyota-shi, Aichi-ken (JP)

(72) Inventors: Rina Yokoi, Toyota (JP); Takashi Suzuki, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 99 days.

(21) Appl. No.: 15/879,823

(22) Filed: Jan. 25, 2018

(65) Prior Publication Data

US 2018/0216552 A1 Aug. 2, 2018

(30) Foreign Application Priority Data

Jan. 30, 2017 (JP) .................................. 2017-014244

(51) Int. Cl.
*F02D 41/02* (2006.01)
*B60W 20/16* (2016.01)
(Continued)

(52) U.S. Cl.
CPC ............ *F02D 41/029* (2013.01); *B60K 6/445* (2013.01); *B60W 10/06* (2013.01); *B60W 10/08* (2013.01); *B60W 10/26* (2013.01); *B60W 20/16* (2016.01); *F01N 3/021* (2013.01); *F01N 3/0842* (2013.01); *F02D 41/123* (2013.01); *F02N 11/0829* (2013.01); *B60W 2510/068* (2013.01); *B60W 2510/244* (2013.01); *B60W 2530/12* (2013.01); *B60W 2710/0627* (2013.01);
(Continued)

(58) Field of Classification Search
CPC .... F02D 41/029; F02D 41/123; B60W 20/16; B60W 10/06; B60W 10/26; F02N 3/021; B60K 6/445
See application file for complete search history.

(56) References Cited

U.S. PATENT DOCUMENTS

2004/0020194 A1* 2/2004 Nishimura .............. F01N 3/023
60/297
2007/0204594 A1 9/2007 Ishii
(Continued)

FOREIGN PATENT DOCUMENTS

JP 2007-230409 9/2007
JP 2015-74233 4/2015
(Continued)

*Primary Examiner* — Stacey A Fluhart
(74) *Attorney, Agent, or Firm* — Finnegan, Henderson, Farabow, Garrett & Dunner, LLP

(57) ABSTRACT

The hybrid vehicle is provide with the control device configured to permit fuel cutoff of the engine when the SOC of the power storage device is greater than a first predetermined ratio, an amount of particulate matter deposited on the filter is less than a first predetermined amount, or a temperature of the filter is lower than a predetermined temperature. The control device is configured to set the allowable upper-limit ratio of the SOC: to a second predetermined ratio greater than the first predetermined ratio when the PM amount is less than a second predetermined amount less than the first predetermined amount, and to a third predetermined ratio equal to or less than the first predetermined ratio when the PM amount is equal to or greater than the second predetermined amount.

4 Claims, 4 Drawing Sheets

(51) Int. Cl.
- *B60K 6/445* (2007.10)
- *B60W 10/06* (2006.01)
- *B60W 10/08* (2006.01)
- *B60W 10/26* (2006.01)
- *F01N 3/08* (2006.01)
- *F02N 11/08* (2006.01)
- *F01N 3/021* (2006.01)
- *F02D 41/12* (2006.01)
- *F02N 11/04* (2006.01)

(52) U.S. Cl.
CPC .. *B60W 2710/244* (2013.01); *B60Y 2300/476* (2013.01); *F01N 2590/11* (2013.01); *F01N 2900/10* (2013.01); *F01N 2900/1602* (2013.01); *F01N 2900/1606* (2013.01); *F02D 2200/0802* (2013.01); *F02D 2200/0812* (2013.01); *F02N 11/04* (2013.01); *F02N 11/0833* (2013.01); *F02N 2200/026* (2013.01); *F02N 2200/061* (2013.01); *Y02T 10/20* (2013.01)

(56) References Cited

U.S. PATENT DOCUMENTS

| | | | |
|---|---|---|---|
| 2010/0192543 A1* | 8/2010 | Fujiwara | F02D 41/0255 60/276 |
| 2012/0209462 A1* | 8/2012 | Roos | B60W 10/06 701/22 |
| 2017/0204761 A1* | 7/2017 | Ulrey | F01N 3/0235 |
| 2018/0149102 A1* | 5/2018 | Kobashi | F02D 41/029 |

FOREIGN PATENT DOCUMENTS

| | | |
|---|---|---|
| JP | 2015-202832 | 11/2015 |
| WO | WO 2015/049565 | 4/2015 |
| WO | WO 2015/159218 A2 | 10/2015 |

\* cited by examiner

HYBRID VEHICLE

INCORPORATION BY REFERENCE

The disclosure of Japanese Patent Application No. 2017-014244 filed on Jan. 30, 2017 including the specification, drawings and abstract is incorporated herein by reference in its entirety.

BACKGROUND

1. Technical Field

The disclosure relates to a hybrid vehicle and more particularly to a hybrid vehicle including an engine in which a filter that removes particulate matter is attached to an exhaust system.

2. Description of Related Art

In the related art, a hybrid vehicle including an engine in which a filter that removes particulate matter is attached to an exhaust system and regeneration of the filter is performed has been proposed as such a type of hybrid vehicle (for example, see Japanese Unexamined Patent Application Publication No. 2015-202832 (JP 2015-202832 A)). In the hybrid vehicle, regeneration of the filter is performed by stopping injection of fuel into the engine and supplying air including oxygen to the filter to combust the particulate matter when the temperature of the filter is in a regeneration temperature range which is suitable for regeneration.

SUMMARY

In the hybrid vehicle, when injection of fuel into the engine is stopped to perform regeneration of the filter, the filter may be overheated due to an increase in temperature of the filter resulting from combustion of the particulate matter deposited on the filter.

A hybrid vehicle according to an aspect of the disclosure prevents a filter, which is attached to an exhaust system of an engine and removes particulate matter, from being overheated.

According to an aspect of the disclosure, there is provided a hybrid vehicle including: an engine of which an exhaust system is provided with a filter configured to remove particulate matter; a motor connected to an output shaft of the engine; a power storage device configured to transmit and receive electric power to and from the motor; and a control device configured to control the engine and the motor such that a state of charge of the power storage device becomes equal to or less than an allowable upper-limit ratio, wherein the control device is configured to permit fuel cutoff of the engine when the state of charge of the power storage device is greater than a first predetermined ratio, an amount of particulate matter deposited on the filter is less than a first predetermined amount, or a temperature of the filter is lower than a predetermined temperature, and to prohibit the fuel cutoff of the engine when the state of charge of the power storage device is equal to or less than the first predetermined ratio, the amount of particulate matter deposited on the filter is equal to or greater than the first predetermined amount, and the temperature of the filter is equal to or higher than the predetermined temperature, and wherein the control device is configured to set the allowable upper-limit ratio to a second predetermined ratio greater than the first predetermined ratio when the amount of particulate matter deposited on the filter is less than a second predetermined amount less than the first predetermined amount, and to set the allowable upper-limit ratio to a third predetermined ratio equal to or less than the first predetermined ratio when the amount of particulate matter deposited on the filter is equal to or greater than the second predetermined amount.

In the hybrid vehicle according to the aspect, the engine and the motor are controlled such that the state of charge of the power storage device becomes equal to or less than the allowable upper-limit ratio. Fuel cutoff (stopping of injection of fuel) of the engine is permitted when the state of charge of the power storage device is greater than a first predetermined ratio, an amount of particulate matter deposited on the filter is less than a first predetermined amount, or a temperature of the filter is lower than a predetermined temperature, and the fuel cutoff of the engine is prohibited when the state of charge of the power storage device is equal to or less than the first predetermined ratio, the amount of particulate matter deposited on the filter is equal to or greater than the first predetermined amount, and the temperature of the filter is equal to or higher than the predetermined temperature. Here, the "first predetermined ratio" is a threshold value for determining whether there is a likelihood that the battery will be overheated when the fuel cutoff of the engine is prohibited (when the fuel cutoff is required and operation (injection of fuel) of the engine is continuously performed without performing the fuel cutoff). The "first predetermined amount" is a threshold value for determining whether regeneration of the filter is necessary. The regeneration of the filter is performed by performing fuel cutoff (stopping of injection of fuel) of the engine and supplying air (oxygen) to the filter to combust the particulate matter deposited on the filter when filter regeneration conditions that the amount of particulate matter deposited on the filter is equal to or greater than the first predetermined amount, and the temperature of the filter is equal to or higher than the regeneration temperature suitable for the regeneration of the filter are satisfied. The "predetermined temperature" is a threshold value which is higher than the regeneration temperature of the filter and is used to determine whether there is a likelihood that the filter will be overheated when the fuel cutoff of the engine is performed, when the amount of particulate matter deposited on the filter is equal to or greater than the first predetermined amount (when it is considered that an amount of heat generated when the particulate matter of the filter is combusted is relatively large). When the state of charge of the power storage device is greater than the first predetermined ratio, the amount of particulate matter deposited on the filter is less than the first predetermined amount, and the temperature of the filter is lower than the predetermined temperature, the fuel cutoff of the engine is permitted and thus it is possible to prevent overcharging of the power storage device or to perform regeneration of the filter. When the state of charge of the power storage device is equal to or less than the first predetermined ratio, the amount of particulate matter deposited on the filter is equal to or greater than the first predetermined amount, and the temperature of the filter is equal to or higher than the predetermined temperature, the fuel cutoff of the engine is prohibited and thus it is possible to prevent particulate matter of the filter from being combusted and to prevent overheating of the filter. In the hybrid vehicle according to the aspect, the allowable upper-limit ratio of the power storage device is set to the second predetermined ratio greater than the first predetermined ratio when the amount of particulate matter deposited on the filter is less than the second predetermined amount less than the first predetermined amount, and the allowable upper-limit ratio is set to the third predetermined ratio equal to or less than the first predetermined ratio when the amount of particulate matter deposited on the filter is equal to or greater than the second predetermined amount. Accordingly, it is possible to prevent the state of charge of the power storage device from becoming greater than the first predetermined ratio when the amount of particulate matter deposited on the filter is equal to or greater than the second predetermined amount. Accordingly, when the amount of particulate matter deposited on the filter is equal to or greater than the first predetermined amount and the temperature of the filter is equal to or higher than the predetermined temperature, that is, when it is able to be determined that there is a likelihood that the filter will be overheated when the fuel cutoff of the engine is performed, it is possible to prevent the fuel cutoff of the engine from being permitted. As a result, it is possible to prevent particulate matter of the filter from being combusted and to prevent overheating of the filter. When the amount of particulate matter deposited on the filter is less than the second predetermined amount, the allowable upper-limit ratio is set to the second predetermined ratio and thus it is possible to relatively enlarge an allowable range of the state of charge of the power storage device. Since the allowable upper-limit ratio is set to the second predetermined ratio, the fuel cutoff of the engine is permitted when the state of charge of the power storage device is greater than the first predetermined ratio. However, since an amount of particulate matter is relatively small, it is considered that an amount of heat generated when the particulate matter is combusted is relatively small and a likelihood of overheating of the filter is sufficiently low even if the fuel cutoff of the engine is performed.

In the hybrid vehicle according to the aspect, the control device may be configured to start a load operation of the engine and power generation of the motor when the engine is not operated as a load and a required power of the engine becomes equal to or greater than a threshold value. The control device may be configured to set the threshold value to a first threshold value when the amount of particulate matter deposited on the filter is less than the second predetermined amount, and to set the threshold value to a second threshold value greater than the first threshold value when the amount of particulate matter deposited on the filter is equal to or greater than the second predetermined amount. According to this configuration, when the amount of particulate matter deposited on the filter is equal to or greater than the second predetermined amount, it is possible to satisfactorily prevent an increase in the state of charge of the power storage device and to satisfactorily prevent the state of charge of the power storage device from becoming greater than the first predetermined ratio.

In the hybrid vehicle according to the aspect, the control device may be configured to perform fuel cutoff of the engine and motoring of the engine using the motor when the fuel cutoff of the engine is required, the fuel cutoff of the engine is permitted, and a predetermined-time ratio which is the state of charge of the power storage device at the time of starting of requesting for fuel cutoff of the engine is greater than the allowable upper-limit ratio. The control device may be configured to perform fuel cutoff of the engine and motoring of the engine using the motor when the fuel cutoff of the engine is required, the fuel cutoff of the engine is permitted, and the state of charge of the power storage device is greater than the allowable upper-limit ratio. According to this configuration, when fuel cutoff of the engine is required and the fuel cutoff of the engine is permitted, it is possible to satisfactorily prevent an increase (promote a decrease) in the state of charge of the power storage device when the predetermined-time ratio or the state of charge is greater than the allowable upper-limit ratio.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an aspect of the disclosure will be described in conjunction with an embodiment.

Figure 1:
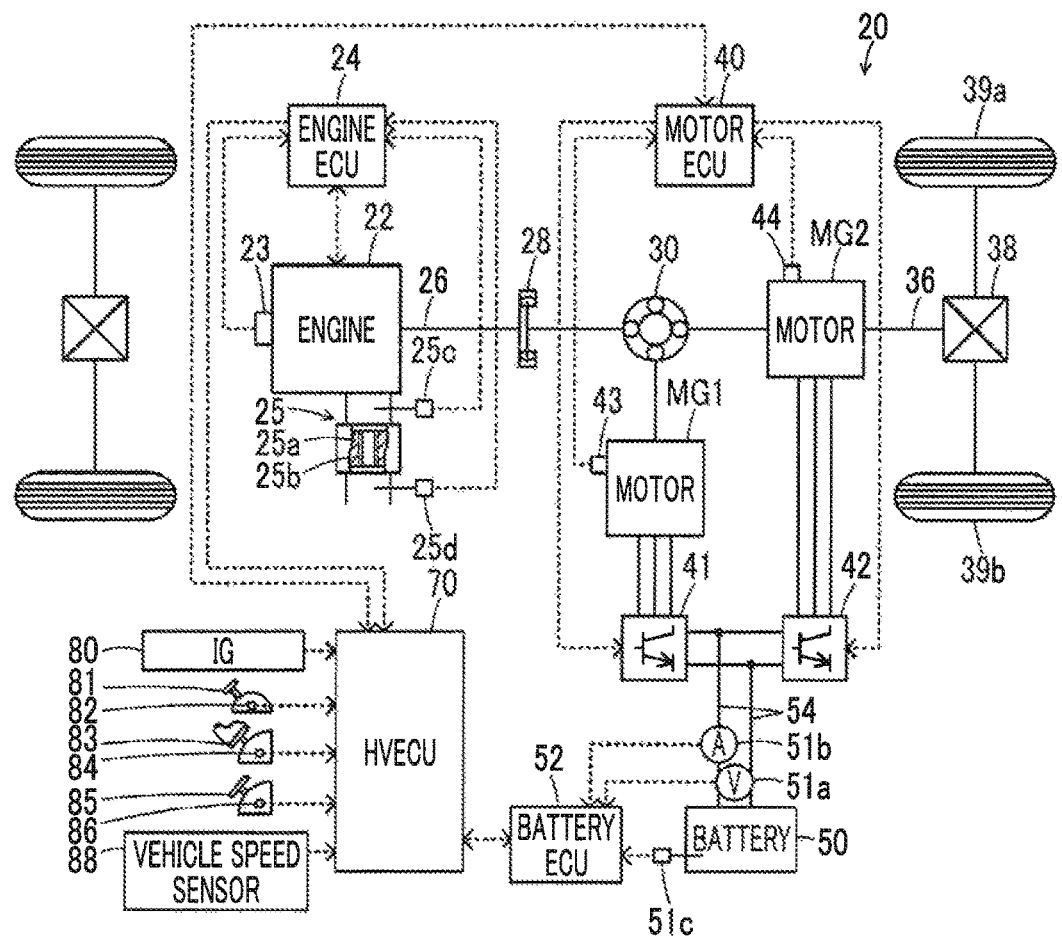
FIG. 1 is a diagram schematically illustrating a configuration of a hybrid vehicle 20 according to an embodiment of the disclosure.

FIG. 1 is a diagram schematically illustrating a configuration of a hybrid vehicle 20 according to an embodiment of the disclosure. As illustrated in the drawing, the hybrid vehicle 20 according to the embodiment includes an engine 22, a planetary gear 30, motors MG1 and MG2, inverters 41 and 42, a battery 50 serving as a power storage device, and a hybrid electronic control unit (hereinafter referred to as an "HVECU") 70.

The engine 22 is configured as an internal combustion engine that outputs power using gasoline, diesel, or the like. A particulate matter removing filter (hereinafter referred to as a "PM filter") 25 is attached to an exhaust system of the engine 22. The PM filter 25 is a member in which a catalyst 25b including precious metal is attached (applied) to a porous substrate 25a formed of a ceramic, stainless steel, or the like to form a unified member, and serves to remove particulate matter (PM) such as soot in exhaust gas and to remove unburned fuel or nitrogen oxides. Operation of the engine 22 is controlled by an engine electronic control unit (hereinafter referred to as an "engine ECU") 24.

The engine ECU 24 is configured as a microprocessor including a CPU as a main unit, which is not illustrated, and includes a ROM that stores a processing program, a RAM that temporarily stores data, input/output ports, and a communication port in addition to the CPU. Signals from various sensors necessary for controlling the operation of the engine 22 are input to the engine ECU 24 via the input port. Examples of the signals input to the engine ECU 24 include a crank angle θcr from a crank position sensor 23 that detects a rotational position of a crank shaft 26 and a coolant temperature Tw from a coolant temperature sensor (not illustrated) that detects a temperature of a coolant of the engine 22. Examples thereof also include a throttle valve opening degree TH from a throttle valve position sensor (not illustrated) that detects a position of a throttle valve, an amount of intake air Qa from an air flowmeter (not illustrated) that is attached to an intake pipe, and an intake air temperature Ta from a temperature sensor (not illustrated) that is attached to the intake pipe. Examples thereof also include pressures P1 and P2 from pressure sensors 25c and 25d that are attached to parts upstream and downstream from the PM filter 25 in the exhaust system. Various control signals for controlling the operation of the engine 22 are output from the engine ECU 24 via the output port. Examples of the signals output from the engine ECU 24 include a drive signal for a throttle motor that adjusts the position of the throttle valve, a drive signal for a fuel injection valve, and a drive signal for an ignition plug. The engine ECU 24 is connected to the HVECU 70 via the communication port. The engine ECU 24 calculates a rotation speed Ne of the engine 22 based on the crank angle θcr from the crank position sensor 23. The engine ECU 24 also calculates a volumetric efficiency (a ratio of a volume of air actually taken in in one cycle to a stroke volume per cycle of the engine 22) KL based on the amount of intake air Qa from the air flowmeter and the rotation speed Ne of the engine 22. In addition, the engine ECU 24 calculates (estimates) an amount of deposited PM Qpm which is an amount of particulate matter deposited on the PM filter 25 based on a pressure difference ΔP (ΔP=P1−P2) between the pressures P1 and P2 from the pressure sensors 25c and 25d or calculates (estimates) a filter temperature Tf which is a temperature of the PM filter 25 based on an operating state (the rotation speed Ne and the volumetric efficiency KL) of the engine 22.

The planetary gear 30 is configured as a single pinion type planetary gear mechanism. A rotor of the motor MG1 is connected to a sun gear of the planetary gear 30. A drive shaft 36 connected to driving wheels 39a and 39b via a differential gear 38 is connected to a ring gear of the planetary gear 30. The crank shaft 26 of the engine 22 is connected to a carrier of the planetary gear 30 via a damper 28.

The motor MG1 is configured as, for example, a synchronous generator motor and the rotor thereof is connected to the sun gear of the planetary gear 30 as described above. The motor MG2 is configured as, for example, a synchronous generator motor and a rotor thereof is connected to the drive shaft 36. The inverters 41 and 42 are used to drive the motors MG1 and MG2 and are connected to the battery 50 via power lines 54. The motors MG1 and MG2 are rotationally driven by causing a motor electronic control unit (hereinafter referred to as a "motor ECU") 40 to control switching of a plurality of switching elements (not illustrated) of the inverters 41 and 42.

The motor ECU 40 is configured as a microprocessor including a CPU as a main unit, which is not illustrated, and includes a ROM that stores a processing program, a RAM that temporarily stores data, input/output ports, and a communication port in addition to the CPU. Signals from various sensors necessary for controlling driving of the motors MG1 and MG2, for example, rotational positions θm1 and θm2 from rotational position sensors 43 and 44 that detect rotational positions of the rotors of the motors MG1 and MG2 and phase currents from current sensors that detect currents flowing in phases of the motors MG1 and MG2, are input to the motor ECU 40 via the input port. Switching control signals for a plurality of switching elements (not illustrated) of the inverters 41 and 42 are output from the motor ECU 40 via the output port. The motor ECU 40 is connected to a HVECU 70 via the communication port. The motor ECU 40 calculates the rotation speeds Nm1 and Nm2 of the motors MG1 and MG2 based on the rotational positions θm1 and θm2 of the rotors of the motors MG1 and MG2 from the rotational position sensors 43 and 44.

The battery 50 is configured as, for example, a lithium-ion secondary battery or a nickel-hydride secondary battery and is connected to the inverters 41 and 42 via the power lines 54. The battery 50 is controlled by a battery electronic control unit (hereinafter referred to as a "battery ECU") 52.

The battery ECU 52 is configured as a microprocessor including a CPU as a main unit, which is not illustrated, and includes a ROM that stores a processing program, a RAM that temporarily stores data, input/output ports, and a communication port in addition to the CPU. Signals from various sensors necessary for controlling the battery 50 are input to the battery ECU 52 via the input port. Examples of the signals input to the battery ECU 52 include a voltage Vb of the battery 50 from a voltage sensor 51a that is installed between terminals of the battery 50, a current Ib of the battery 50 from a current sensor 51b that is attached to the output terminal of the battery 50, and a temperature Tb of the battery 50 from a temperature sensor 51c that is attached to the battery 50. The battery ECU 52 is connected to the HVECU 70 via the communication port. The battery ECU 52 calculates a state of charge SOC based on an integrated value of the current Ib of the battery 50 from the current sensor 51b. The state of charge SOC is a ratio of a dischargeable power capacity from the battery 50 to a full capacity of the battery 50.

The HVECU 70 is configured as a microprocessor including a CPU as a main unit, which is not illustrated, and includes a ROM that stores a processing program, a RAM that temporarily stores data, input/output ports, and a communication port in addition to the CPU. Signals from various sensors are input to the HVECU 70 via the input port. Examples of the signals input to the HVECU 70 include an ignition signal from an ignition switch 80 and a shift position SP from a shift position sensor 82 that detects an operation position of a shift lever 81. Examples thereof also include an accelerator operation amount Acc from an accelerator pedal position sensor 84 that detects an amount of depression of an accelerator pedal 83, a brake pedal position BP from a brake pedal position sensor 86 that detects an amount of depression of a brake pedal 85, and a vehicle speed V from a vehicle speed sensor 88. The HVECU 70 is connected to the engine ECU 24, the motor ECU 40, and the battery ECU 52 via the communication port as described above.

The hybrid vehicle 20 according to the embodiment having the above-mentioned configuration travels in a hybrid traveling mode (an HV traveling mode) in which the vehicle travels with rotation (operation or fuel cutoff during rotation) of the engine 22 or an electric traveling mode (an EV traveling mode) in which the vehicle travels with rotation of the engine 22 stopped (operation stopped).

In the HV traveling mode, the HVECU 70 sets a required torque Td* which is required for traveling (required for the drive shaft 36) based on the accelerator operation amount Acc, the brake pedal position BP, and the vehicle speed V, and calculates a required power Pd* which is required for traveling (required for the drive shaft 36) by multiplying the set required torque Td* by a rotation speed Nd of the drive shaft 36 (for example, the rotation speed Nm2 of the motor MG2). Subsequently, the HVECU 70 sets a required charging/discharging power Pb* (which has a positive value when electric power is discharged from the battery 50) based on the state of charge SOC of the battery 50. Here, the required charging/discharging power Pb* is set such that the state of charge SOC of the battery 50 is equal to or less than an allowable upper-limit ratio Smax (a predetermined value S1 or a predetermined value S2 which will be described later), that is, such that the state of charge SOC approaches a target ratio SOC* (for example, 45%, 47%, or 50%) which is less than the allowable upper-limit ratio Smax. The method of setting the allowable upper-limit ratio Smax will be described later. When the state of charge SOC of the battery 50 is greater than the allowable upper-limit ratio Smax, the required charging/discharging power Pb* is set to a larger value than when the state of charge SOC of the battery 50 is equal to or less than the allowable upper-limit ratio Smax. This is for causing the state of charge SOC of the battery 50 to rapidly become equal to or less than the allowable upper-limit ratio Smax by causing the battery 50 to discharge a relatively large amount of power. A required power Pe* required for the vehicle (required for the engine 22) is calculated by subtracting the required charging/discharging power Pb* of the battery 50 from the required power Pd*.

When the required power Pe* is set in this way, basically, a target rotation speed Ne* and a target torque Te* of the engine 22 and torque commands Tm1* and Tm2* of the motors MG1 and MG2 are set such that the required power Pe* is output from the engine 22 and the required torque Td* is output to the drive shaft 36. The target rotation speed Ne* and the target torque Te* of the engine 22 are transmitted to the engine ECU 24, and the torque commands Tm1* and Tm2* of the motors MG1 and MG2 are transmitted to the motor ECU 40. When the target rotation speed Ne* and the target torque Te* of the engine 22 are received, the engine ECU 24 performs control of an amount of intake air, fuel injection control, ignition control, and the like of the engine 22 such that the engine 22 operates based on the target rotation speed Ne* and the target torque Te*. When the torque commands Tm1* and Tm2* of the motors MG1 and MG2 are received, the motor ECU 40 performs switching control of a plurality of switching elements of the inverters 41 and 42 such that the motors MG1 and MG2 are driven in accordance with the torque commands Tm1* and Tm2*.

In the HV traveling mode, when the engine 22 is operated as a load and the required power Pe* becomes less than a threshold value Psp (for example, 7 kW, 8 kW, or 9 kW), fuel cutoff or no-load operation of the engine 22 is started. When the fuel cutoff of the engine 22 is performed, motoring of the engine 22 using the motor MG1 may be performed or may not be performed. When the fuel cutoff of the engine 22 is performed, but the motoring of the engine 22 using the motor MG1 is not performed, and rotation of the engine 22 is stopped, the traveling mode transitions to the EV traveling mode.

In the HV traveling mode, when the engine 22 is not operated as a load (when the fuel cutoff is performed or no-load operation is performed) and the required power Pe* becomes equal to or greater than a threshold value Pst (a predetermined value Pst1 or a predetermined value Pst2 which will be described later) greater than the threshold value Psp, load operation of the engine 22 is started with the motoring of the engine 22 using the motor MG1 if necessary. The method of setting the threshold value Pst will be described later.

In the EV traveling mode, the HVECU 70 sets the required torque Td* based on the accelerator operation amount Acc, the brake pedal position BP, and the vehicle speed V, sets the torque command Tm1* of the motor MG1 to a value of zero, sets the torque command Tm2* of the motor MG2 such that the required torque Td* is output to the drive shaft 36, and transmits the torque commands Tm1* and Tm2* of the motors MG1 and MG2 to the motor ECU 40. Control of the inverters 41 and 42 by the motor ECU 40 is the same as described above.

In the EV traveling mode, when the required power Pe* which is calculated in the same ways as in the HV traveling mode becomes equal to or greater than the threshold value Pst greater than the threshold value Psp, the engine 22 is started with the motoring of the engine 22 using the motor MG1, the traveling mode transitions to the HV traveling mode, and load operation of the engine 22 is started.

In the hybrid vehicle 20 according to this embodiment, when filter regeneration conditions for regenerating the PM filter 25 are satisfied in the HV traveling mode and injection of fuel to the engine 22 is stopped (the fuel cutoff is performed), regeneration of the PM filter 25 is performed by supplying air (oxygen) to the PM filter 25 to combust particulate matter deposited on the PM filter 25. Here, as the filter regeneration conditions, conditions that the amount of deposited PM Qpm which is an amount of particulate matter deposited on the PM filter 25 is equal to or greater than a threshold value Qpmref1 and the filter temperature Tf which is the temperature of the PM filter 25 is equal to or higher than a threshold value Tfref1 are used. The threshold value Qpmref1 is a threshold for determining whether regeneration of the PM filter 25 is necessary, and examples thereof include 4 g/L, 4.5 g/L, and 5 g/L. The threshold value Tfref1 is a threshold value for determining whether the filter temperature Tf reaches a regeneration temperature which is suitable for regeneration of the PM filter 25, and examples thereof include 580° C., 600° C., and 620° C.

Figure 2:
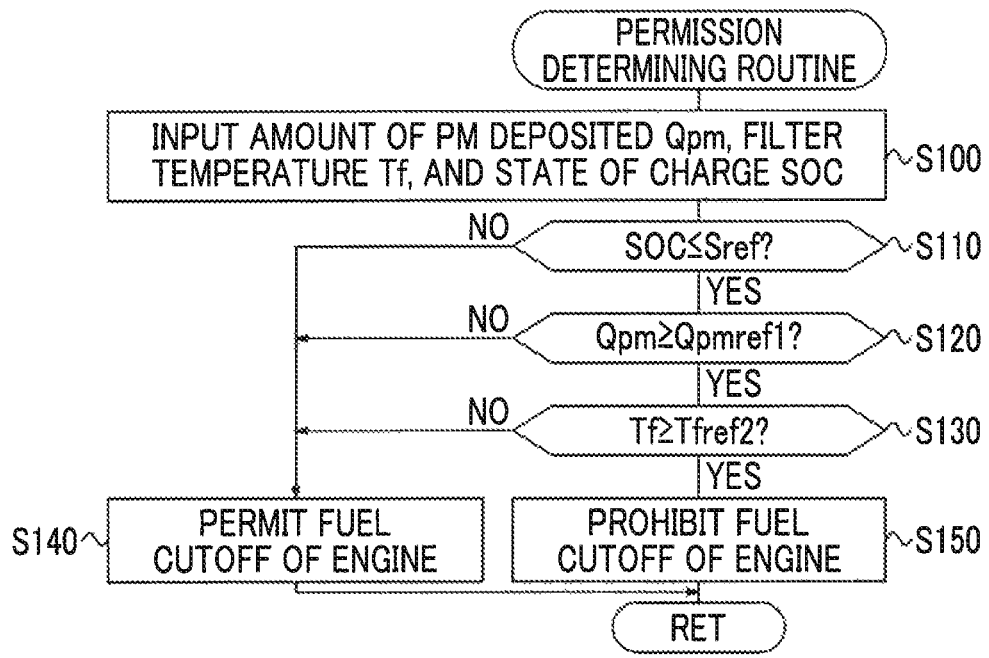
FIG. 2 is a flowchart illustrating an example of a permission determining routine which is performed by a HVECU 70.
Figure 3:
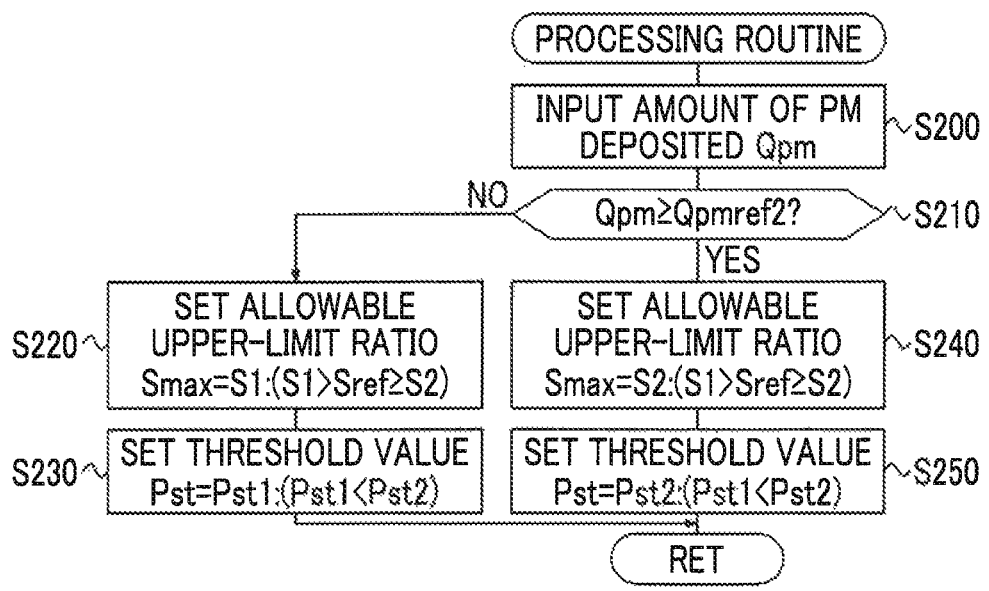
FIG. 3 is a flowchart illustrating an example of a processing routine which is performed by the HVECU 70.

The operation of the hybrid vehicle 20 according to this embodiment having the above-mentioned configuration will be described below. FIG. 2 is a flowchart illustrating an example of a permission determining routine which is performed by the HVECU 70 to permit or prohibit the fuel cutoff of the engine 22. FIG. 3 is a flowchart illustrating an example of a processing routine which is performed by the HVECU 70 to set the allowable upper-limit ratio Smax of the battery 50 or the threshold value Pst. These routines are repeatedly performed. The routines will be sequentially described below.

The permission determining routine illustrated in FIG. 2 will be described below. When this routine is performed, first, the HVECU 70 receives data such as the amount of deposited PM Qpm, the filter temperature Tf, and the state of charge SOC of the battery 50 (Step S100). Here, as the amount of deposited PM Qpm, a value which has been calculated (estimated) based on the pressure difference ΔP (ΔP=P1−P2) between the pressures P1 and P2 from the pressure sensors 25c and 25d is input from the engine ECU 24 by communication. As the filter temperature Tf, a value which has been calculated (estimated) based on the operating states of the engine 22 is input from the engine ECU 24 by communication. As the state of charge SOC of the battery 50, a value which has been calculated based on an integrated value of the current Ib of the battery 50 from the current sensor 51b is input from the battery ECU 52 by communication.

When data is input in this way, the state of charge SOC of the battery 50 is compared with a threshold value Sref of the state of charge SOC (Step S110). Here, the threshold value Sref is a threshold value for determining whether there is a likelihood that the battery 50 will be overcharged when the fuel cutoff of the engine 22 is prohibited (when the fuel cutoff is required and the operation (injection of fuel) is continuously performed without performing the fuel cutoff), and examples thereof include 68%, 70%, and 72%. The fuel cutoff of the engine 22 is required after the required power Pe* becomes less than the threshold value Psp in the HV traveling mode and until the required power Pe* becomes equal to or greater than the threshold value Pst in the HV traveling mode or the EV traveling mode.

When it is determined in Step S110 that the state of charge SOC of the battery 50 is equal to or less than the threshold value Sref, it is determined that the likelihood that the battery 50 will be overcharged even is sufficiently low when the fuel cutoff of the engine 22 is prohibited. The amount of deposited PM Qpm is compared with the threshold value Qpmref1 (Step S120), and the filter temperature Tf is compared with a threshold value Tfref2 higher than the threshold value Tfref1 when the amount of deposited PM Qpm is equal to or greater than the threshold value Qpmref1 (Step S130). The processes of Steps S120 and S130 are processes for determining whether there is a likelihood that the PM filter 25 will be overheated when the fuel cutoff of the engine 22 is performed.

The threshold value Tfref2 is a threshold value for determining whether there is a likelihood that the PM filter 25 will be overheated (the filter temperature Tf will increase to equal to or higher than an overheating temperature Tfot) when the fuel cutoff of the engine 22 is performed, when the amount of deposited PM Qpm is equal to or greater than the threshold value Qpmref1 (when it is assumed that an amount of heat generated when particulate matter of the PM filter 25 is combusted is relatively large), and is considered to be a temperature which is lower by 50° C., 100° C., or 150° C. than the overheating temperature Tfot. When the amount of deposited PM Qpm is less than the threshold value Qpmref1, an amount of particulate matter is relatively small. Accordingly, even when the fuel cutoff of the engine 22 is performed, an amount of heat generated when particulate matter is combusted is relatively small and it is considered that the likelihood that the PM filter 25 will be overheated is sufficiently low. The overheating temperature Tfot is a temperature for determining whether the PM filter 25 is overheated, is a temperature at which there is a likelihood that a certain abnormality (for example, damage of the substrate 25a or the catalyst 25b) will occur in the PM filter 25 or a temperature slightly lower than the temperature, and examples thereof include 930° C., 950° C., and 970° C.

When it is determined in Step S120 that the amount of deposited PM Qpm is less than the threshold value Qpmref1 or it is determined in Step S130 that the filter temperature Tf is lower than the threshold value Tfref2, it is determined that the likelihood that the PM filter 25 will be overheated is sufficiently low even when the fuel cutoff of the engine 22 is performed, the fuel cutoff of the engine 22 is permitted (Step S140), and the routine ends.

In this case, when the engine 22 is operated as a load in the HV traveling mode and the required power Pe* becomes less than the threshold value Psp, the fuel cutoff of the engine 22 is started. When the filter regeneration conditions are satisfied and the fuel cutoff of the engine 22 is performed, regeneration of the PM filter 25 is performed as described above. When the fuel cutoff of the engine 22 is performed and rotation of the engine 22 is stopped, the traveling mode transitions to the EV traveling mode.

In the embodiment, in performing the fuel cutoff of the engine 22, motoring of the engine 22 using the motor MG1 is not performed when a predetermined-time ratio SOCa which is the state of charge SOC of the battery 50 at a time at which the required power Pe* becomes less than the threshold value Psp is equal to or less than the allowable upper-limit ratio Smax, and motoring of the engine 22 using the motor MG1 is also performed when the predetermined-time ratio SOCa is greater than the allowable upper-limit ratio Smax. In the former, the traveling mode is likely to transition to the EV traveling mode. In the latter, an increase of the state of charge SOC of the battery 50 can be satisfactorily prevented (a decrease can be promoted) due to power consumption of the motor MG1. When the required power Pe* is less than the threshold value Psp in the HV traveling mode and the required torque Td* has a negative value, the required torque Td* is covered with a braking torque (hereinafter referred to as a "regenerative braking torque") applied to the drive shaft 36 by regenerative operation of the motor MG2 in the former, and the required torque Td* is covered with a braking torque (hereinafter referred to as a "motoring braking torque") applied to the drive shaft 36 by motoring of the engine 22 using the motor MG1 or both the regenerative braking torque and the motoring braking torque in the latter.

When it is determined in Step S120 that the amount of deposited PM Qpm is equal to or greater than the threshold value Qpmref1 and it is determined in Step S130 that the filter temperature Tf is equal to or higher than the threshold value Tfref2, it is determined that there is a likelihood that the PM filter 25 will be overheated when the fuel cutoff of the engine 22 is performed, the fuel cutoff of the engine 22 is prohibited (Step S150), and then the routine ends.

In this case, when the engine 22 is operated as a load in the HV traveling mode and the required power Pe* becomes less than the threshold value Psp, no-load operation of the engine 22 is started. Accordingly, in comparison with a case in which the fuel cutoff of the engine 22 is performed, it is possible to prevent particulate matter of the PM filter 25 from being combusted and to prevent overheating of the PM filter 25. As a result, it is possible to further protect the PM filter 25 (the substrate 25a or the catalyst 25b). When the required power Pe* is less than the threshold value Psp in the HV traveling mode and the required torque Td* has a negative value, the required torque Td* is covered with the regenerative braking torque.

When it is determined in Step S110 that the state of charge SOC of the battery 50 is greater than the threshold value Sref, it is determined that there is a likelihood that the battery 50 will be overcharged when the fuel cutoff of the engine 22 is prohibited, the fuel cutoff of the engine 22 is permitted (Step S140), and then the routine ends.

In this case, when the engine 22 is operated as a load in the HV traveling mode and the required power Pe* becomes less than the threshold value Psp, the fuel cutoff of the engine 22 is started. When the filter regeneration conditions are satisfied and the fuel cutoff of the engine 22 is performed, regeneration of the PM filter 25 is performed. In the embodiment, the motoring of the engine 22 using the motor MG1 is performed when the fuel cutoff of the engine 22 is performed. Accordingly, it is possible to more satisfactorily prevent an increase (promote a decrease) in the state of charge SOC of the battery 50 by the power consumption in the motor MG1 and to more satisfactorily prevent the battery 50 from being overcharged. When the required power Pe* is less than the threshold value Psp in the HV traveling mode and the required torque Td* has a negative value, the regenerative operation of the motor MG2 is prohibited (the regenerative braking torque is not used) and the required torque Td* is covered with the motoring braking torque. Accordingly, it is possible to more satisfactorily prevent the battery 50 from being overcharged.

The processing routine illustrated in FIG. 3 will be described below. When this routine is performed, the HVECU 70 receives the amount of deposited PM Qpm (Step S200), and compares the received amount of deposited PM Qpm with a threshold value Qpmref2 less than the threshold value Qpmref1 (Step S210). The method of inputting the amount of deposited PM Qpm has been described above. Examples of the threshold value Qpmref2 include 1 g/L, 1.5 g/L, and 2 g/L.

When it is determined in Step S210 that the amount of deposited PM Qpm is less than the threshold value Qpmref2, the allowable upper-limit ratio Smax of the battery 50 is set to a predetermined value S1 which is greater than the threshold value Sref (Step S220), the threshold value Pst is set to a predetermined value Pst1 (Step S230), and then the routine ends. For example, the predetermined value S1 is a value which is greater by 3%, 5%, or 7% than the threshold value Sref. For example, the predetermined value Pst1 is a value which is greater by 7 kW, 8 kW, or 9 kW than the threshold value Psp.

When it is determined in Step S210 that the amount of deposited PM Qpm is equal to or greater than the threshold value Qpmref2, the allowable upper-limit ratio Smax of the battery 50 is set to a predetermined value S2 which is equal to or less than the threshold value Sref (Step S240), the threshold value Pst is set to a predetermined value Pst2 which is greater than the predetermined value Pst1 (Step S250), and then the routine ends. For example, the predetermined value S2 is a value which is less by 5%, 7%, or 10% than the threshold value Sref. For example, the predetermined value Pst2 is a value which is greater by 2 kW, 3 kW, or 4 kW than the predetermined value Pst1.

In this way, when the amount of deposited PM Qpm is equal to or greater than the threshold value Qpmref2, the allowable upper-limit ratio Smax of the battery 50 is set to the predetermined value S2 equal to or less than the threshold value Sref and thus it is possible to prevent the state of charge SOC of the battery 50 from becoming greater than the threshold value Sref. Accordingly, when the amount of deposited PM Qpm is equal to or greater than the threshold value Qpmref1 and the filter temperature Tf is equal to or higher than the threshold value Tfref2, that is, when there is a likelihood that the PM filter 25 will be overheated when the fuel cutoff of the engine 22 is performed, it is possible to prevent the fuel cutoff of the engine 22 from being permitted. Accordingly, it is possible to prevent particulate matter of the PM filter 25 from being combusted and to prevent the PM filter 25 from being overheated (prevent the filter temperature Tf from becoming equal to or greater than the overheating temperature Tfot). As a result, it is possible to further protect the PM filter 25 (the substrate 25a or the catalyst 25b). When the amount of deposited PM Qpm is less than the threshold value Qpmref2, the allowable upper-limit ratio Smax of the battery 50 is set to the predetermined value S1 which is greater than the threshold value Sref and thus it is possible to relatively enlarge the allowable range of the state of charge SOC of the battery 50. At this time, the fuel cutoff of the engine 22 is permitted by the permission determining routine illustrated in FIG. 2 when the state of charge SOC of the battery 50 is greater than the threshold value Sref, but an amount of particulate matter of the PM filter 25 is relatively small. Accordingly, even when the fuel cutoff of the engine 22 is performed, it is considered that an amount of heat generated when the particulate matter is combusted is relatively small and the likelihood that the PM filter 25 will be overheated is sufficiently low.

When the amount of deposited PM Qpm is equal to or greater than the threshold value Qpmref2, the threshold value Pst is set to a larger value than when the amount of deposited PM Qpm is less than the threshold value Qpmref2. Accordingly, when the engine 22 is not operated as a load, it is possible to prevent the load operation (and the power generation of the motor MG1) from being started. As a result, it is possible to satisfactorily prevent an increase in the state of charge SOC of the battery 50 and to satisfactorily prevent the state of charge SOC from becoming greater than the threshold value Sref.

Figure 4:
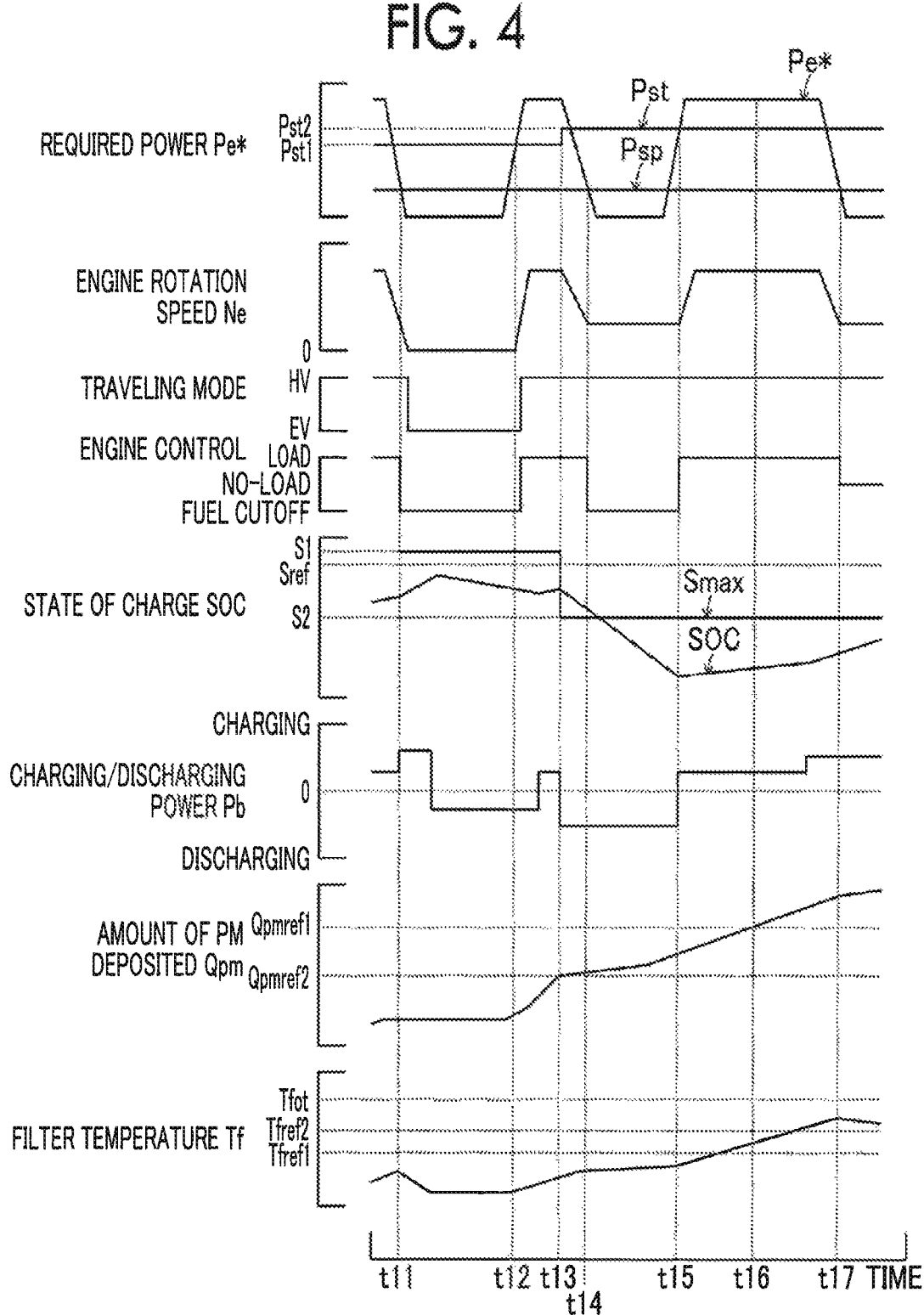
FIG. 4 is a diagram illustrating an example of temporal changes of a rotation speed Ne or a required power Pe* of an engine 22, control of the engine 22, a state of charge SOC or a charging/discharging power Pb of a battery 50, an amount of deposited PM Qpm, and a filter temperature Tf.

FIG. 4 is a diagram illustrating an example of temporal changes of the rotation speed Ne or the required power Pe* of the engine 22, control of the engine 22, the state of charge SOC or the charging/discharging power Pb of the battery 50, the amount of deposited PM Qpm, and the filter temperature Tf. In FIG. 4, a value which is less than the threshold value Sref is used as the predetermined value S2. As illustrated in the drawing, when the required power Pe* becomes less than the threshold value Psp in the HV traveling mode at time t11, the state of charge SOC of the battery 50 at that time is equal to or less than the threshold value Sref and the allowable upper-limit ratio Smax (the predetermined value S1) and the fuel cutoff of the engine 22 is performed, but the motoring of the engine 22 using the motor MG1 is not performed. When rotation of the engine 22 is stopped, the traveling mode transitions from the HV traveling mode to the EV traveling mode. When the required power Pe* becomes equal to or greater than the threshold value Pst (the predetermined value Pst1) in the EV traveling mode at time 12, the engine 22 is started, the traveling mode transitions to the HV traveling mode, and the load operation of the engine 22 and the power generation of the motor MG1 are started. When the amount of deposited PM Qpm becomes equal to or greater than the threshold value Qpmref2 at time t13, the threshold value Pst is switched from the predetermined value Pst1 to the predetermined value Pst2 which is greater than the predetermined value Pst1 and the allowable upper-limit ratio Smax is switched from the predetermined value S1 to the predetermined value S2 which is less than the predetermined value S1. When the state of charge SOC of the battery 50 becomes greater than the allowable upper-limit ratio Smax due to the decrease of the allowable upper-limit ratio Smax, the engine 22 and the motors MG1 and MG2 are controlled such that discharging of the battery 50 is promoted. When the required power Pe* becomes less than the threshold value Psp at time t14, the state of charge SOC of the battery 50 at that time (the predetermined-time ratio SOCa) is greater than the allowable upper-limit ratio Smax, and the fuel cutoff of the engine 22 and the motoring of the engine 22 using the motor MG1 are performed. Accordingly, it is possible to promote the decrease in the state of charge SOC of the battery 50 by the power consumption in the motor MG1. When the required power Pe* becomes equal to or greater than the threshold value Pst at time t15, the load operation of the engine 22 and the power generation of the motor MG1 are started. When the filter regeneration conditions are satisfied at time t16 and the required power Pe* becomes less than the threshold value Psp at time t17, the filter temperature Tf at that time is equal to or higher than the threshold value Tfref2, the fuel cutoff of the engine 22 is prohibited, and the no-load operation is started. Accordingly, it is possible to prevent particulate matter of the PM filter 25 from being combusted and to prevent the PM filter 25 from being overheated. As a result, it is possible to further protect the PM filter 25 (the substrate 25a or the catalyst 25b).

In the above-mentioned hybrid vehicle 20 according to this embodiment, when the amount of deposited PM Qpm is equal to or greater than the threshold value Qpmref2 which is less than the threshold value Qpmref1, the allowable upper-limit ratio Smax of the battery 50 is set to the predetermined value S2 which is equal to or less than the threshold value Sref. Accordingly, it is possible to prevent the state of charge SOC of the battery 50 from becoming greater than the threshold value Sref. Accordingly, when the amount of deposited PM Qpm is equal to or greater than the threshold value Qpmref1 and the filter temperature Tf is equal to or higher than the threshold value Tfref2, that is, when there is a likelihood that the PM filter 25 will be overheated when the fuel cutoff of the engine 22 is performed, it is possible to prevent the fuel cutoff of the engine 22 from being permitted and to prevent particulate matter of the PM filter 25 from being combusted. As a result, it is possible to prevent the PM filter 25 from being overheated and to further protect the PM filter 25 (the substrate 25a or the catalyst 25b). When the amount of deposited PM Qpm is less than the threshold value Qpmref2, the allowable upper-limit ratio Smax of the battery 50 is set to the predetermined value S1 which is greater than the threshold value Sref. Accordingly, it is possible to relatively enlarge the allowable range of the state of charge SOC of the battery 50.

In the hybrid vehicle 20 according to this embodiment, when the amount of deposited PM Qpm is equal to or greater than the threshold value Qpmref2, the threshold value Pst is set to a larger value than when the amount of deposited PM Qpm is less than the threshold value Qpmref2. However, the threshold value Pst may be set to a fixed value regardless of the amount of deposited PM Qpm.

In the hybrid vehicle 20 according to this embodiment, when the fuel cutoff of the engine 22 is required in the HV traveling mode, the fuel cutoff of the engine 22 is permitted, and the predetermined-time ratio SOCa is greater than the allowable upper-limit ratio Smax, the fuel cutoff of the engine 22 and the motoring of the engine 22 using the motor MG1 are performed. In this case, when the predetermined-time ratio SOCa is greater than the allowable upper-limit ratio Smax, it is possible to satisfactorily prevent an increase (promote a decrease) in the state of charge SOC of the battery 50. However, when the state of charge SOC of the battery 50 (a value which varies sequentially) is greater than the allowable upper-limit ratio Smax, the fuel cutoff of the engine 22 and the motoring of the engine 22 using the motor MG1 may be performed. In this case, when the state of charge SOC of the battery 50 is greater than the allowable upper-limit ratio Smax, it is possible to more satisfactorily prevent an increase (promote a decrease) in the state of charge SOC of the battery 50.

In the hybrid vehicle 20 according to this embodiment, the battery 50 is used as a power storage device. However, an arbitrary device such as a capacitor may be used as the power storage device, as long as it can store electric power.

The hybrid vehicle 20 according to this embodiment includes the engine ECU 24, the motor ECU 40, the battery ECU 52, and the HVECU 70, but at least two thereof may be configured as a single electronic control unit.

Figure 5:
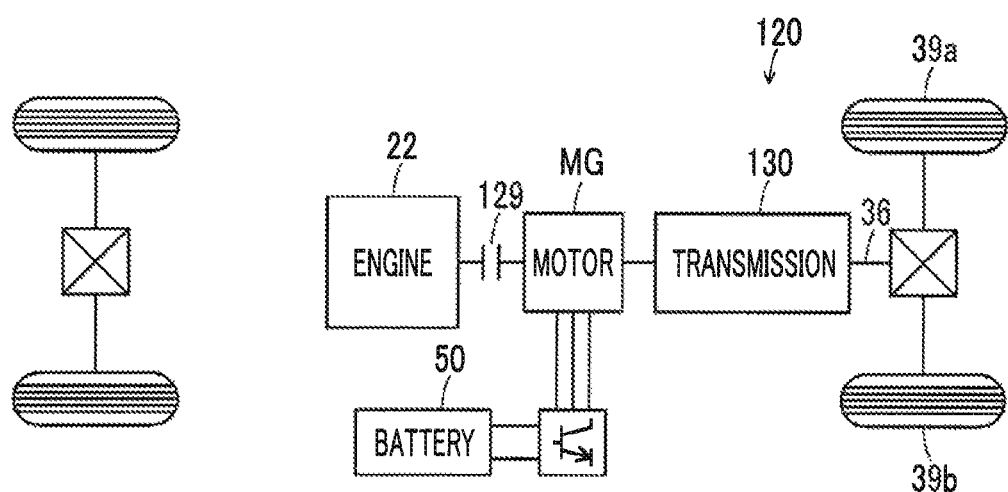
FIG. 5 is a diagram schematically illustrating a configuration of a hybrid vehicle 120 according to a modified example.

In the embodiment, the hybrid vehicle 20 has a configuration in which the engine 22 and the motor MG1 are connected to the drive shaft 36 connected to the driving wheels 39a and 39b via the planetary gear 30 and the motor MG2 is connected to the drive shaft 36 to perform gear shift. However, as in a hybrid vehicle 120 according to a modified example illustrated in FIG. 5, the hybrid vehicle 120 may have a configuration in which a motor MG is connected to the drive shaft 36 connected to the driving wheels 39a and 39b via a transmission 130 and the engine 22 is connected to the motor MG via a clutch 129. That is, so long as it is a configuration of a hybrid vehicle including an engine in which a particulate matter removing filter that removes particulate matter is attached to an exhaust system, a motor that is connected to an output shaft of the engine, and a power storage device that transmits and receives electric power to and from the motor, an arbitrary configuration of a hybrid vehicle may be employed.

Correspondence between the elements in the embodiment and the elements in the claims will be described below. The engine 22 in the embodiment serves as an "engine," the motor MG1 serves as a "motor," the battery 50 serves as a "power storage device," and the HVECU 70, the engine ECU 24, the motor ECU 40, and the battery ECU 52 serve as a "control device."

The disclosure can be applied to industries for manufacturing hybrid vehicles.

What is claimed is:

1. A hybrid vehicle comprising:
an engine of which an exhaust system is provided with a filter configured to remove particulate matter;
a motor connected to an output shaft of the engine;
a power storage device configured to transmit and receive electric power to and from the motor; and
a control device configured to control the engine and the motor such that a state of charge of the power storage device becomes equal to or less than an allowable upper-limit ratio,
wherein the control device is configured to permit fuel cutoff of the engine when the state of charge of the power storage device is greater than a first predetermined ratio, an amount of particulate matter deposited on the filter is less than a first predetermined amount, or a temperature of the filter is lower than a predetermined temperature, and to prohibit the fuel cutoff of the engine when the state of charge of the power storage device is equal to or less than the first predetermined ratio, the amount of particulate matter deposited on the filter is equal to or greater than the first predetermined amount, and the temperature of the filter is equal to or higher than the predetermined temperature, and
wherein the control device is configured to set the allowable upper-limit ratio to a second predetermined ratio greater than the first predetermined ratio when the amount of particulate matter deposited on the filter is less than a second predetermined amount less than the first predetermined amount, and to set the allowable upper-limit ratio to a third predetermined ratio equal to or less than the first predetermined ratio when the amount of particulate matter deposited on the filter is equal to or greater than the second predetermined amount.

2. The hybrid vehicle according to claim 1, wherein the control device is configured to start a load operation of the engine and power generation of the motor when the engine is not operated as a load and a required power of the engine becomes equal to or greater than a threshold value, and
wherein the control device is configured to set the threshold value to a first threshold value when the amount of particulate matter deposited on the filter is less than the second predetermined amount, and to set the threshold value to a second threshold value greater than the first threshold value when the amount of particulate matter deposited on the filter is equal to or greater than the second predetermined amount.

3. The hybrid vehicle according to claim 1, wherein the control device is configured to perform fuel cutoff of the engine and motoring of the engine using the motor when the fuel cutoff of the engine is required, the fuel cutoff of the engine is permitted, and a predetermined-time ratio which is the state of charge of the power storage device at a time of starting of requesting for fuel cutoff of the engine is greater than the allowable upper-limit ratio.

4. The hybrid vehicle according to claim 1, wherein the control device is configured to perform fuel cutoff of the engine and motoring of the engine using the motor when the fuel cutoff of the engine is required, the fuel cutoff of the engine is permitted, and the state of charge of the power storage device is greater than the allowable upper-limit ratio.

\* \* \* \* \*